(12) United States Patent
Asabu et al.

(10) Patent No.: US 8,565,832 B2
(45) Date of Patent: Oct. 22, 2013

(54) MOBILE COMMUNICATION DEVICE AND CHARGING SYSTEM FOR MOBILE COMMUNICATION DEVICE

(75) Inventors: Hiroko Asabu, Daito (JP); Minako Tani, Daito (JP)

(73) Assignee: Kyocera Corporation, Fushimi-Ku (JP)

( * ) Notice: Subject to any disclaimer, the term of this patent is extended or adjusted under 35 U.S.C. 154(b) by 136 days.

(21) Appl. No.: 13/126,114

(22) PCT Filed: Oct. 26, 2009

(86) PCT No.: PCT/JP2009/005636
§ 371 (c)(1),
(2), (4) Date: Apr. 26, 2011

(87) PCT Pub. No.: WO2010/050171
PCT Pub. Date: May 6, 2010

(65) Prior Publication Data
US 2011/0207507 A1  Aug. 25, 2011

(30) Foreign Application Priority Data

Oct. 28, 2008 (JP) ................................ 2008-277226

(51) Int. Cl.
*H04B 1/38* (2006.01)
(52) U.S. Cl.
USPC ......................................... 455/566; 455/573
(58) Field of Classification Search
USPC ........... 455/566, 418–420, 556.1, 556.2, 557, 455/559, 573–574
See application file for complete search history.

(56) References Cited

U.S. PATENT DOCUMENTS

| 2007/0032262 | A1 | 2/2007 | Namatame et al. |
| 2009/0100258 | A1* | 4/2009 | Sung ............................ 713/100 |
| 2010/0041333 | A1* | 2/2010 | Ungari et al. ................ 455/41.2 |

FOREIGN PATENT DOCUMENTS

| JP | A-2002-057752 | 2/2002 |
| JP | A-2003-125040 | 4/2003 |
| JP | A-2005-043676 | 2/2005 |
| JP | A-2005-277697 | 10/2005 |
| JP | A-2007-049562 | 2/2007 |

OTHER PUBLICATIONS

International Search Report issued in Application No. PCT/JP2009/005636; Dated Nov. 24, 2009 (With Translation).
Jul. 30, 2012 Korean Office Action issued in Korean Application No. 10-2011-7012125 (with translation).

* cited by examiner

*Primary Examiner* — Brandon Miller
(74) *Attorney, Agent, or Firm* — Oliff & Berridge, PLC

(57) ABSTRACT

A mobile phone includes a first power receiving portion that receives power from a charging base, a first touch panel, a function execution portion, a first LCD to display information, a first display control portion to display on the first LCD an output image outputted when the function execution portion executes a function or an input image for accepting an operation to execute the function, and a first communication portions cannot communicate with the charging base, and the first display control portion displays a first screen on the first LCD when the first communication portion is incapable of communicating with the charging base, and when the first communication portion can communicate with the charging base, it displays a second screen on the first LCD and transmits a third screen to the charging base via the first communication portion and causes the charging base to display the third screen on the second LCD provided therein.

4 Claims, 10 Drawing Sheets

MOBILE COMMUNICATION DEVICE AND CHARGING SYSTEM FOR MOBILE COMMUNICATION DEVICE

TECHNICAL FIELD

The present invention relates to a mobile communication device and a charging system for the mobile communication device, and more specifically, to a charging system for the mobile communication device which includes a mobile communication device and a charging device.

BACKGROUND ART

A mobile communication terminal as represented by a mobile phone utilizes a secondary cell such as a lithium-ion battery and a nickel hydride battery as a driving source so that there is a need to charge the secondary cell. Normally, the mobile communication terminal is mounted on a charging base connected to a commercial power source, thereby receiving the supply of electric power from the charging base and charging the secondary cell.

Japanese Patent Laid-Open No. 2002-057752 describes a portable terminal device in which a speech message control portion inside a charging base, upon detecting that the portable terminal device is placed on the charging base, selects PCM speech message data which is most suitable for the circumstance of that time or that day from at least one or more PCM speech message data stored in a memory portion inside the charging base, based on various types of parameters including transmission and reception log data read from the portable terminal device, transfers the selected PCM speech message data to a control portion of the portable terminal device, and converts it into analog voice and plays it on a speaker provided in the portable terminal device.

With this portable terminal device, the charging base transmits a message to the portable terminal device so that the portable terminal device outputs the message from the speaker only when it is placed on the charging base, and there is a problem that a user is unable to operate the portable terminal device while the portable terminal device is placed on the charging base.

[Patent Document 1] Japanese Patent Laid-Open No. 2002-057752

DISCLOSURE OF THE INVENTION

Problems to be Solved by the Invention

The present invention is made to solve the above-described problem, and an object of the present invention is to provide a mobile communication device in which the convenience of operation during charging is enhanced.

Another object of the present invention is to provide a charging system for the mobile communication device in which the convenience of operation during charging is enhanced.

Means for Solving the Problems

In order to achieve the above-described objects, according to one aspect of the present invention, in a mobile communication device charged by being connected to a power supply unit that supplies electric power, the mobile communication device includes a first power receiving portion to receive supply of electric power from the power supply unit, a first operation accepting portion to accept a first operation by a user, a function execution portion to execute at least one of a plurality of functions, a first display portion to display information, a first display control portion to display at the first display portion an output image outputted when the function execution portion executes a function or an operation accepting image for accepting an operation in order to execute the function, and a first communication portion to communicate with the power supply unit, and is characterized in that the first display control portion displays at the first display portion a first image predetermined in correspondence to an executed function when the first communication portion is incapable of communicating with the power supply unit and displays at the first display portion a second image predetermined in correspondence to the executed function being executed by the function execution portion among a plurality of functions as well as controls the power supply unit via the first communication portion in correspondence to the executed function being executed when the first communication portion is capable of communicating with the power supply unit.

According to another aspect of the present invention, a charging system for a mobile communication device is the charging system for the mobile communication device including a mobile communication device and a charging device to charge the mobile communication device, and the mobile communication device includes a first power receiving portion to receive supply of electric power from the charging device, a first operation accepting portion to accept a first operation by a user, a function execution portion to execute at least one of a plurality of functions, a first display portion to display information, a first display control portion to display at the first display portion an output image outputted when the function execution portion executes a function or an operation accepting image for accepting an operation in order to execute the function, and a first communication portion to communicate with the charging device, wherein the charging device includes a second power receiving portion to accept electric power from outside, a second communication portion to communicate with the mobile communication device, a second display portion to display an image, and a second display control portion to control display of the image by the second display portion, and wherein the first display control portion displays at the first display portion a first image predetermined in correspondence to an executed function when the first communication portion is incapable of communicating with the charging device and displays at the first display portion a second image predetermined in correspondence to the executed function being executed by the function execution portion among a plurality of functions as well as controls the second display control portion via the first communication portion to display at the second display portion a third image predetermined in correspondence to the executed function when the first communication portion is capable of communicating with the charging device.

According to a further aspect of the present invention, a charging system for a mobile communication device is the charging system for the mobile communication device including a mobile communication device and a charging device to charge the mobile communication device, and the mobile communication device includes a first power receiving portion to receive supply of electric power from the charging device, a first operation accepting portion to accept a first operation by a user, a function execution portion to execute at least one of a plurality of functions, a first display portion to display information, a first display control portion to display at the first display portion an output image outputted when the function execution portion executes a function or an operation accepting image for accepting an operation in order to execute the function, and a first communication portion to communicate with the charging device, wherein the charging device includes a second power receiving portion to accept electric power from outside, a power supply portion to supply at least a portion of the accepted electric power to the mobile communication device, a second display portion to display an image, a second communication portion to communicate with the mobile communication device, and a second display control portion to control display of the image by the second display portion, wherein the first display control portion displays at the first display portion a first image predetermined in correspondence to an executed function when the first communication portion is incapable of communicating with the charging device and displays at the first display portion a second image predetermined in correspondence to the executed function being executed by the function execution portion among a plurality of functions as well as transmits a third image predetermined in correspondence to the executed function via the first communication portion to the second display control portion when the first communication portion is capable of communicating with the charging device, and wherein the second display control portion displays at the second display portion the third image received by the second communication portion.

BEST MODES FOR CARRYING OUT THE INVENTION

Figure 1:
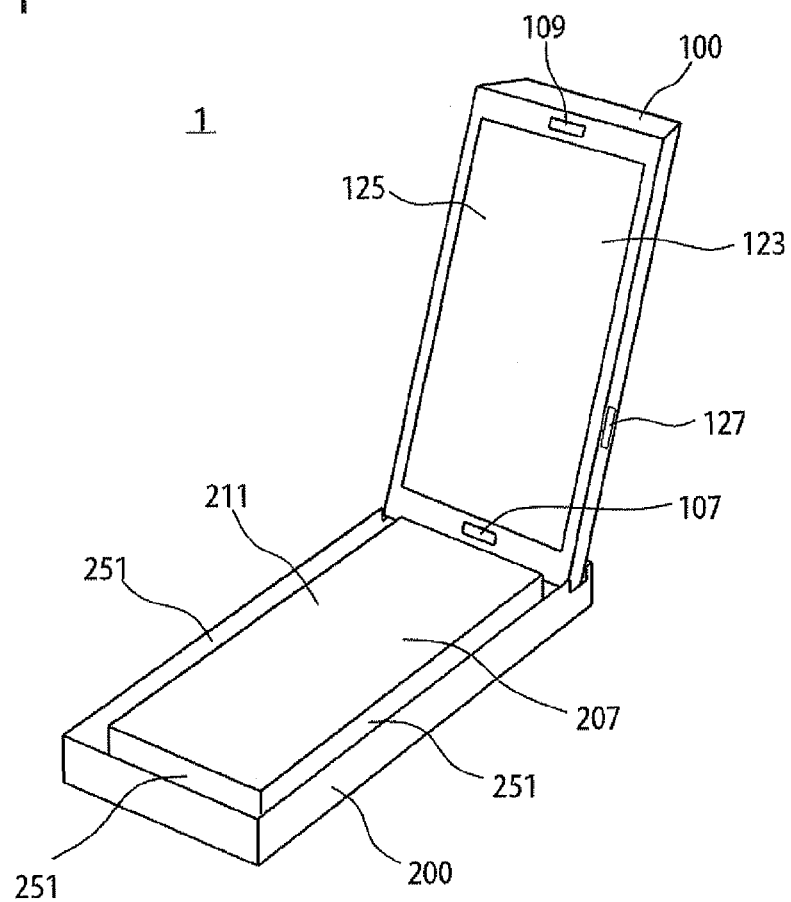
FIG. 1 is a perspective view showing the external appearance of a charging system of a mobile phone according to one of the embodiments of the present invention.

The embodiments of the present invention will be described below with reference to the drawings. In the following description, the same or corresponding parts are denoted by the same reference characters. Their names and functions are also the same. Thus, the detailed description thereof will not be repeated.

FIG. 1 is a perspective view showing the external appearance of a charging system of a mobile phone according to one of the embodiments of the present invention. With reference to FIG. 1, a charging system 1 of a mobile phone is formed by a mobile phone 100 and a charging base 200. FIG. 1 shows mobile phone 100 being connected to charging base 200 in a first form of connection. Mobile phone 100 has an approximately rectangular parallelepiped shape, with a first liquid crystal display (LCD) 123, a first touch panel 125, a microphone 107, and a speaker 109 serving as a receiver arranged in the front and a power key 127 disposed on a side face. First touch panel 125 is formed by a transparent member and is disposed superposing first LCD 123.

Charging base 200 has an approximately rectangular parallelepiped shape, with a second liquid crystal display (LCD) 207 and a second touch panel 211 arranged on the top surface and a groove 251 formed along their perimeter on the top surface. Mobile phone 100 is connected to charging base 200 by having a portion of the mobile phone engage a portion of groove 251 provided in charging base 200. Second touch panel 211 is formed by a transparent member and is disposed superposing second LCD 207.

First touch panel 125 and second touch panel 211 may be of a pressure-sensitive type which senses a change in pressure, or they may be of a capacitive type which senses an electrical signal due to static electricity. Here, the capacitive type is used. If first touch panel 125 is to be a capacitive type, it may be disposed on the back side of first LCD 123. In addition, if second touch panel 211 is to be a capacitive type, it may be disposed on the back side of second LCD 207. Moreover, first LCD 123 and second LCD 207 only need to be display devices which are capable of displaying an image of a shape or a character, and it may be an organic EL (Electro Luminescence) display, for instance.

It is possible to connect mobile phone 100 and charging base 200 in a plurality of forms of connection, and the first form of connection shown in FIG. 1 is the form in which a portion on the side of one of the side faces in the direction of the width of mobile phone 100 engages one of grooves 251 in the direction of the width of the charging base, thereby connecting mobile phone 100 with charging base 200.

Figure 2:
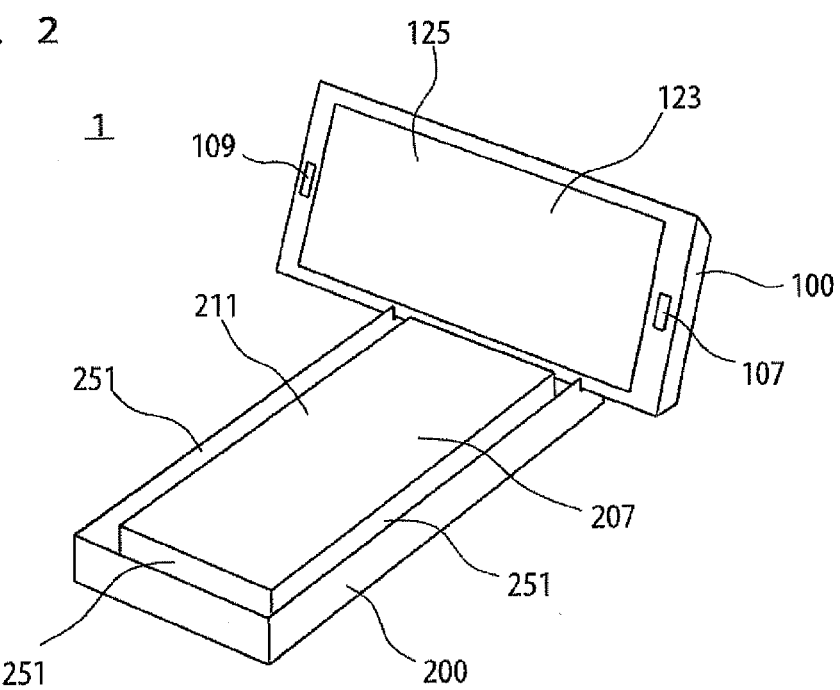
FIG. 2 is perspective view showing an overview of the charging system of the mobile phone in which the mobile phone and a charging base are connected in a second form of connection.

FIG. 2 is perspective view showing an overview of the charging system of the mobile phone in which the mobile phone and the charging base are connected in a second form of connection. With reference to FIG. 2, the second form of connection is the form in which a portion on the side of one of the side faces in the direction of the length of mobile phone 100 engages one of grooves 251 in the direction of the width of the charging base, thereby connecting mobile phone 100 with charging base 200.

Figure 3:
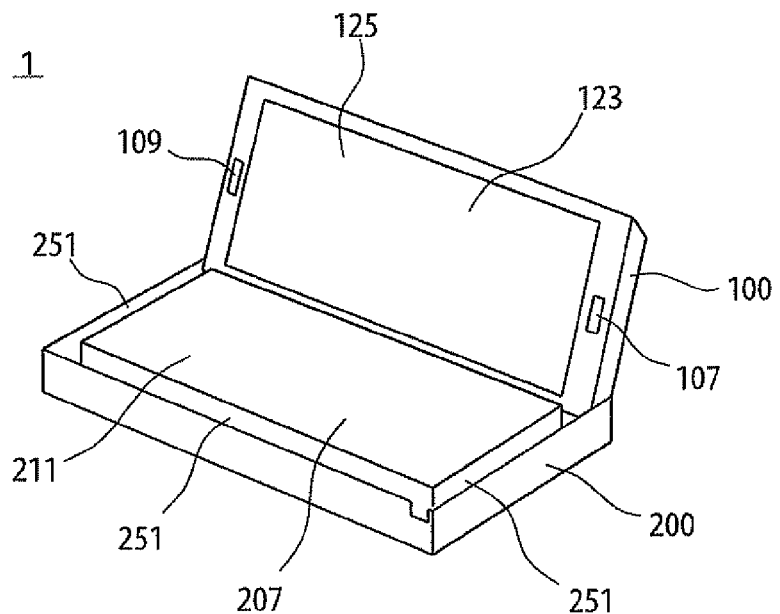
FIG. 3 is perspective view showing an overview of the charging system of the mobile phone in which the mobile phone and the charging base are connected in a third form of connection.

FIG. 3 is perspective view showing an overview of the charging system of the mobile phone in which the mobile phone and the charging base are connected in a third form of connection. With reference to FIG. 3, the third form of connection is the form in which a portion on the side of one of the side faces in the direction of the length of mobile phone 100 engages one of grooves 251 in the direction of the length of the charging base, thereby connecting mobile phone 100 with charging base 200.

Figure 4:
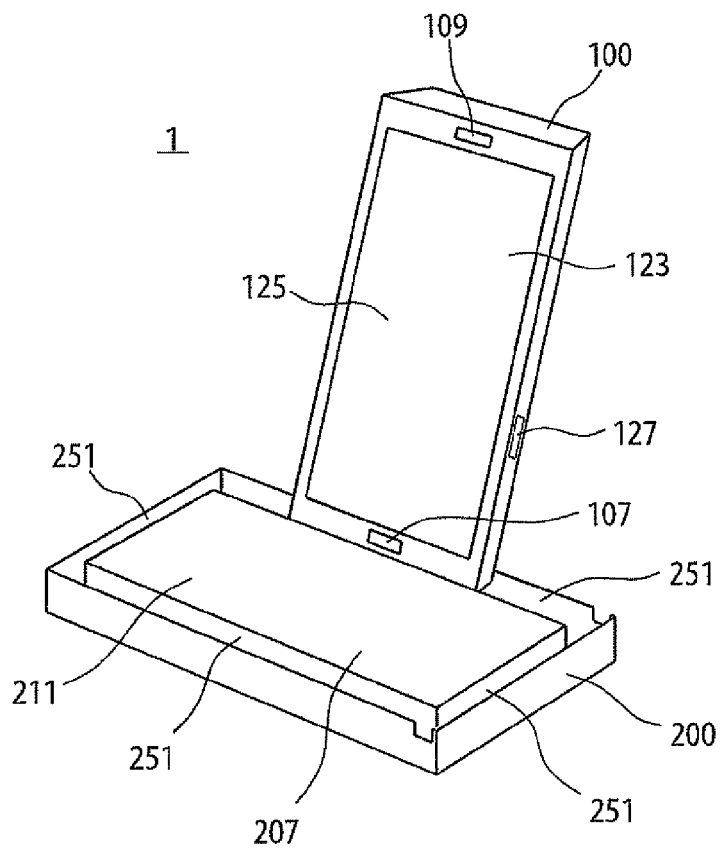
FIG. 4 is perspective view showing an overview of the charging system of the mobile phone in which the mobile phone and the charging base are connected in a fourth form of connection.

FIG. 4 is perspective view showing an overview of the charging system of the mobile phone in which the mobile phone and the charging base are connected in a fourth form of connection. With reference to FIG. 4, the fourth form of connection is the form in which a portion on the side of one of the side faces in the direction of the width of mobile phone 100 engages a portion of one of grooves 251 in the direction of the length of the charging base, thereby connecting mobile phone 100 with charging base 200.

Moreover, although the example is shown here in which mobile phone 100 is connected to charging base 200 by having a portion of mobile phone 100 engage a portion of groove 251 provided in charging base 200, if mobile phone 100 can be fixed to charging base 200, they may be connected using a hook or the like without providing groove 251 in charging base 200, for instance, so that it is not limited to the connecting method of connecting mobile phone 100 with charging base 200 by providing groove 251 in charging base 200.

Figure 5:
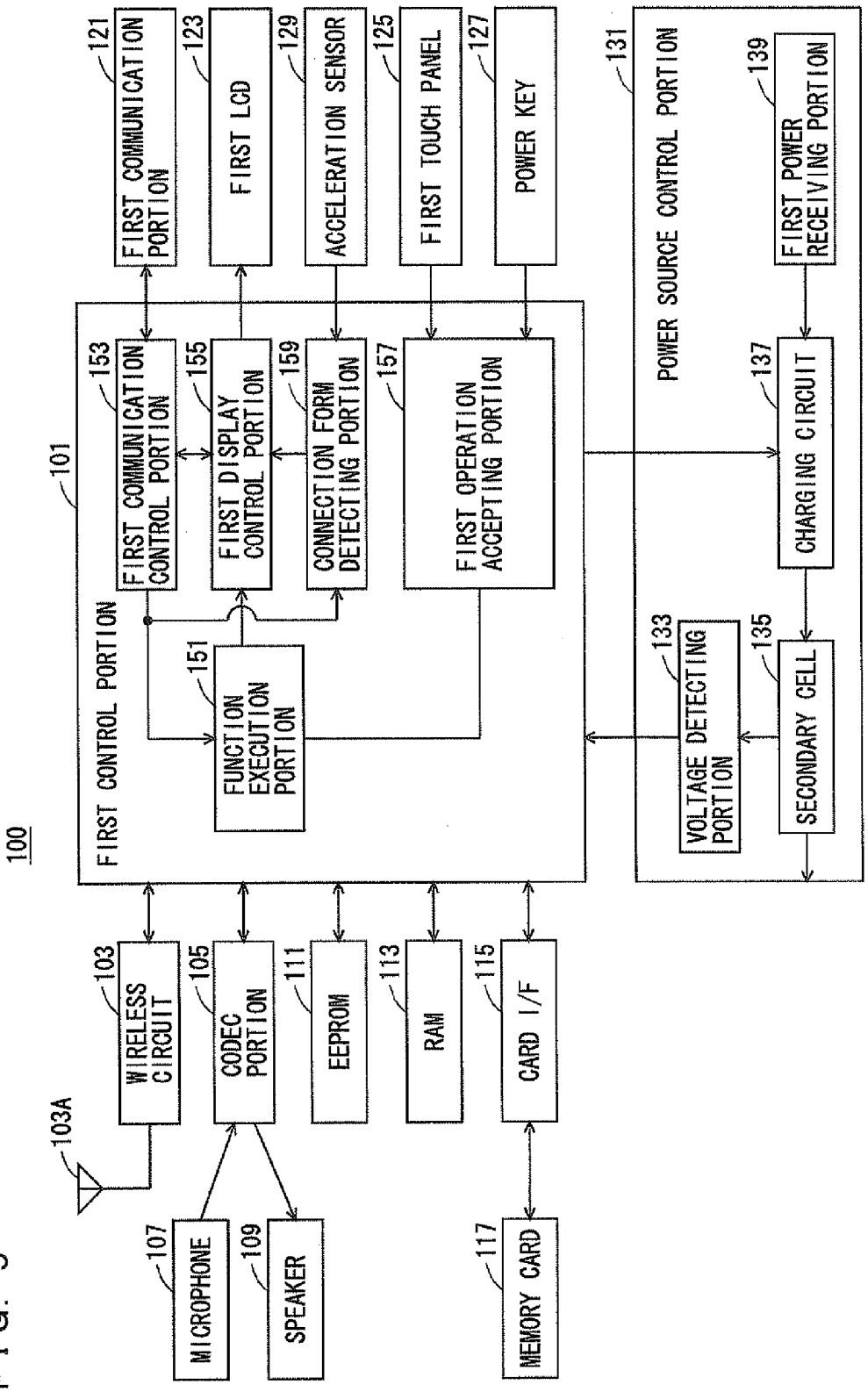
FIG. 5 is a schematic block diagram of a function of the mobile phone.

FIG. 5 is a schematic block diagram of a function of the mobile phone. With reference to FIG. 5, mobile phone 100 includes a first control portion 101 to control the entire mobile phone 100, a wireless circuit 103 connected to an antenna 103A, a codec portion 105 to process voice data, microphone 107 and speaker 109 respectively connected to codec portion 105, an EEPROM (Electronically Erasable Programmable Read Only Memory) 111 to store in a nonvolatile manner a program to be executed in first control portion 101 or data and the like to be referred to by the program, a RAM (Random Access Memory) 113 to be used as a work area of first control portion 101, a card interface (I/F) 115, a first communication portion 121 to communicate with charging base 200, first LCD 123, power key 127 and first touch panel 125 to accept input of operation by a user, an acceleration sensor 129, and a power source control portion 131.

Wireless circuit 103 is controlled by first control portion 101 and communicates with a wireless base station. More specifically, a radio signal received by antenna 103A is inputted and an audio signal which is the radio signal demodulated is outputted to codec portion 105. Moreover, wireless circuit 103 has the audio signal inputted from codec portion 105 and outputs to antenna 103A a radio signal which is the audio signal modulated. Codec portion 105 decodes the audio signal inputted from wireless circuit 103, converts the decoded digital audio signal into analog form, amplifies it, and then outputs it to speaker 109. In addition, codec portion 105 has an analog audio signal inputted from microphone 107, converts the audio signal into digital form, encodes it, and then outputs the encoded audio signal to wireless circuit 103.

Card I/F 115 has a removable memory card 117 attached thereto. First control portion 101 is capable of accessing memory card 117 via card I/F 115. Moreover, although the example is described here in which a program to be executed in first control portion 101 is stored in EEPROM 111, the program may be stored in memory card 117, and the program may be read from memory card 117 and be executed in first control portion 101. The storage media for storing the program is not limited to memory card 117 and may also be a flexible disk, a cassette tape, an optical disk [CD-ROM (Compact Disc-ROM)/MO (Magnetic Optical Disc)/MD (Mini Disc)/DVD (Digital Versatile Disc)], an IC card, an optical card, and a semiconductor memory such as a mask ROM, an EPROM, an EEPROM, and the like. In addition, mobile phone 100 may be connected to the Internet via wireless circuit 103, and a program may be downloaded from a computer connected to the Internet and be executed in first control portion 101. The program referred to herein includes not only a program directly executable by first control portion 101 but also a source program, a compressed program, an encrypted program, and the like.

Power source control portion 131 includes a first power receiving portion 139 to receive the supply of electric power from the charging base, a secondary cell 135 to supply stored electric power to each load of mobile phone 100, a charging circuit 137 provided between secondary cell 135 and first power receiving portion 139, and a voltage detecting portion 133. First power receiving portion 139 receives the electromagnetic wave emitted from a power supply portion 215 (see FIG. 8) provided in charging base 200 as described later and outputs the electric current generated by the electromagnetic induction to charging circuit 137. Moreover, although the example in which electromagnetic wave that becomes the electric power is received from charging base 200 is described here, first power receiving portion 139 may serve as an input terminal which is electrically connected to an output terminal provided in charging base 200.

Secondary cell 135 is a lithium polymer battery, a nickel hydride battery, or a nickel-cadmium battery and the like, and stores electrical charges. Charging circuit 137 is controlled by first control portion 101 and switches between the on-state in which the electric current outputted by first power receiving portion 139 is outputted to secondary cell 135 and the off-state in which it is not outputted to secondary cell 135. Voltage detecting portion 133 detects the output voltage of secondary cell 135 and outputs the detected output voltage to first control portion 101.

First communication portion 121 communicates by wireless with charging base 200. The communication method may be a communication using electromagnetic waves or a communication using infrared ray. In addition, a communication method which allows communication at close range is preferable, because it is sufficient that mobile phone 100 becomes capable of communication simply when connected to charging base 200. Moreover, mobile phone 100 may be electrically connected to charging base 200 and first communication portion 121 may communicate with charging base 200 by wired communication.

Acceleration sensor 129 detects the acceleration of each of an X-axis, a Y-axis, and a Z-axis which are orthogonal to one another, and outputs the detected acceleration to first control portion 101. Although the accelerations detected by acceleration sensor 129 here are of the X-axis, the Y-axis, and the Z-axis, they only need to be of three directions that intersect with one another, and further, they may be of four or more directions.

First control portion 101 includes a first communication control portion 153 to control first communication portion 121, a first display control portion 155 to control display of first LCD 123, a function execution portion 151 to execute at least one of a plurality of functions, a first operation accepting portion 157 to accept an operation by a user, and a connection form detecting portion 159 to detect the form of connection with charging base 200.

Function execution portion 151 executes a plurality of functions which mobile phone 100 is capable of executing. The plurality of functions, for instance, include an electronic mail editing function, an electronic mail viewing function, an electronic mail transmitting and receiving function, a call function, a phone book editing function, a browser function for browsing a Web page on the Internet, a calendar display function, a schedule management function, a television broadcast viewing function, and so on. Moreover, the functions which function execution portion 151 is capable of executing are not limited to the above-mentioned functions and may also be added by adding an application program to be executed by first control portion 101.

First operation accepting portion 157 has first touch panel 125 and power key 127 connected thereto and accepts the operation by the user inputted into first touch panel 125 or power key 127. First operation accepting portion 157 outputs the operation accepted from first touch panel 125 or power key 127 to function execution portion 151. Function execution portion 151 decides on and executes at least one of a plurality of functions according to the operation inputted from first operation accepting portion 157.

First communication control portion 153 controls first communication portion 121. When first communication portion 121 becomes capable of communicating with charging base 200, first communication control portion 153 outputs to first display control portion 155 a signal indicating that the communication with charging base 200 is possible, and if first communication portion 121 is incapable of communicating with charging base 200, a signal indicating that the communication with charging base 200 is impossible is outputted. In addition, upon receiving a signal that indicates the operation given to function execution portion 151 from charging base 200 by first communication portion 121 communicating with charging base 200, first communication control portion 153 outputs the operation specified by that signal to function execution portion 151. Function execution portion 151 decides on and executes at least one of a plurality of functions according to the operation inputted from first communication control portion 153. Thus, function execution portion 151 executes a function according to the operation inputted from first operation accepting portion 157 or first communication control portion 153. Moreover, when first communication portion 121 receives a location of connection from charging base 200, first communication control portion 153 outputs the received location of connection to connection form detecting portion 159. While the location of connection will be described later, it is the information that indicates which one of the four sides of groove 251 provided in charging base 200 the location of connection is.

Connection form detecting portion 159 is connected to acceleration sensor 129 and detects the position of mobile phone 100 based on the accelerations in the direction of three axes at the time point when the respective accelerations in the direction of the three axes cease to change. Moreover, connection form detecting portion 159 decides which of the first to fourth forms of connection the form of connection between mobile phone 100 and charging base 200 is, based on the location of connection inputted from first communication control portion 153 and on the position of mobile phone 100 detected. Then, the form of connection decided among the first to fourth forms of connection is outputted to first display control portion 155.

First display control portion 155 stores in advance a first screen which is a first image of a first kind, a second screen which is a second image of a second kind, and a third screen which is a third image of a third kind in relation to each of a plurality of functions which function execution portion 151 is capable of executing. The first screen, the second screen, and the third screen are images that can be displayed by each of first LCD 123 and second LCD 207, and they may be images of the same size as the display surface of each of first LCD 123 and second LCD 207, or they may be images of a size smaller than their display surfaces. First display control portion 155 decides which of the first to third screens to display based on the signal which indicates whether or not it is possible to communicate with charging base 200 outputted by first communication control portion 153. More specifically, in the case where the signal indicating that it is impossible to communicate with the charging base is inputted from first communication control portion 153, first display control portion 155 selects the first screen as the image to be displayed on first LCD 123, while in the case where the signal indicating that it is possible to communicate with charging base 200 is inputted from first communication control portion 153, it selects the first screen as the image to be displayed on first LCD 123 as well as selects the second screen as the image to be displayed on second LCD 207. When selecting the first screen, first display control portion 155 displays the first screen on first LCD 123. Moreover, when selecting the second screen and the third screen, first display control portion 155 displays the second screen on first LCD 123 as well as outputs the third screen to first communication control portion 153 in order to display the third screen on second LCD 207. When the third screen is inputted from first display control portion 155, first communication control portion 153 controls first communication portion 121 and transmits the third screen to charging base 200.

The third screen includes various kinds of operation accepting screens for accepting an operation by the user. More specifically, the various kinds of operation accepting screens include a ten-key type operation accepting screen in which the ten-keys are laid out and an alphabet-type operation accepting screen in which a plurality of keys, to each of which one character of the alphabet is allotted, are arranged in the QWERTY layout. In addition, the key layout of the alphabet-type operation accepting screen is not limited to the QWERTY layout and may be of the Dvorak layout.

To first display control portion 155, a form of connection is inputted from connection form detecting portion 159. In the case where the second screen and the third screen are selected and when an operation accepting screen is to be selected for the third screen, first display control portion 155 outputs the ten-key type operation accepting screen as the third screen to first communication control portion 153 when the first form of connection or the second form of connection is inputted from connection form detecting portion 159 and outputs the QWERTY type operation accepting screen as the third screen to first communication control portion 153 when the third form of connection or the fourth form of connection is inputted from connection form detecting portion 159.

In the first form of connection shown in FIG. 1 or in the second form of connection shown in FIG. 2, the charging base is arranged with its lengthwise dimension disposed vertically in relation to the user. Consequently, the QWERTY type operation accepting screen cannot be displayed so that the ten-key type operation accepting screen is displayed on charging base 200. On the other hand, in the third form of connection shown in FIG. 3 or in the fourth form of connection shown in FIG. 4, the charging base is arranged with its lengthwise dimension disposed horizontally in relation to the user. Consequently, the QWERTY type operation accepting screen can be displayed so that the QWERTY type operation accepting screen which is the key layout that allows easy input of characters is displayed on charging base 200.

Figure 6:
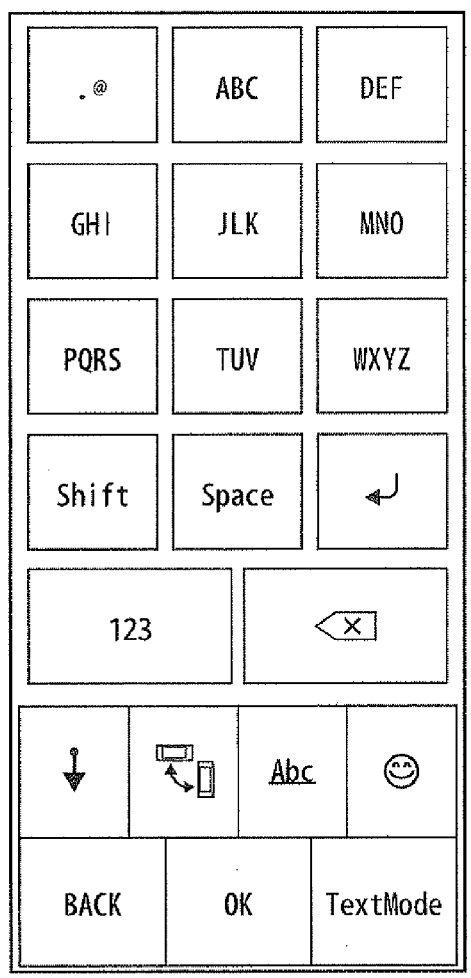
FIG. 6 is a diagram showing one example of a ten-key type operation accepting screen.
Figure 7:
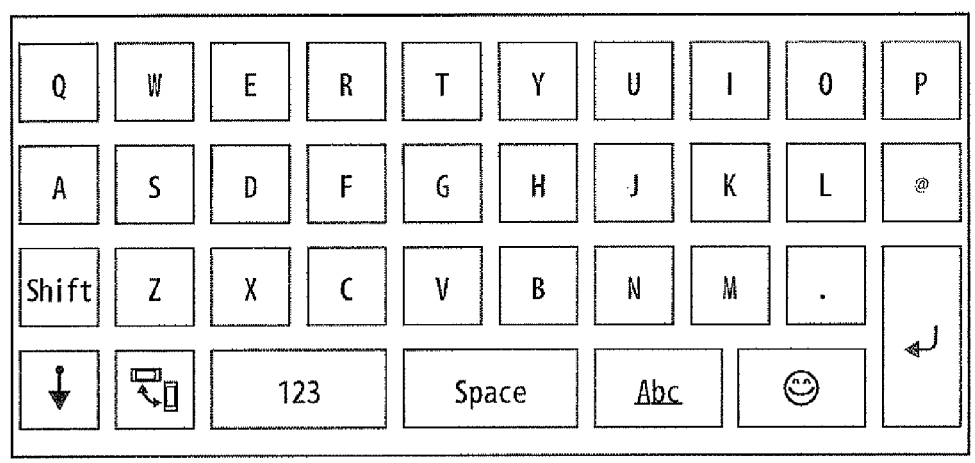
FIG. 7 is a diagram showing one example of a QWERTY type operation accepting screen.

FIG. 6 is a diagram showing one example of the ten-key type operation accepting screen. With reference to FIG. 7, the QWERTY type operation accepting screen has a plurality of keys laid out including eight keys to each of which three or four alphabetic characters are allotted. The selection of a character in the ten-key type operation accepting screen involves selecting one character based on the key pushed and the number of times the key is pushed. For instance, if the key to which three alphabetic characters "A," "B," and "C" are allotted is pushed once, "A" will be selected; if the key is pushed twice, "B" will be selected; and if the key is pushed three times, "C" will be selected.

FIG. 7 is a diagram showing one example of the QWERTY type operation accepting screen. A plurality of keys, each having one character of the alphabet allotted thereto, are arranged in the QWERTY layout. In the QWERTY type operation accepting screen, one character is allotted to one key. Consequently, in comparison with the ten-key type operation accepting screen in which a plurality of characters are allotted to one key, the number of times the key is pushed can be decreased when inputting a character, which facilitates inputting of the characters.

<Multitasking Mode>

Going back to FIG. 5, function execution portion 151 is capable of executing two functions among a plurality of executable functions in parallel. For instance, a browsing function and an electronic mail creating function can be executed simultaneously. Consequently, while a Web page displayed by the execution of the browsing function is viewed, the main text of the electronic mail may be edited. Hereinafter, the operation mode of function execution portion 151 where function execution portion 151 executes two functions in parallel will be referred to as a multitasking mode, whereas the operation mode where a single function is executed will be referred to as a single-tasking mode.

When the operation mode of function execution portion 151 is the multitasking mode, first display control portion 155 displays on first LCD 123 a first screen of a first kind corresponding to a first function of the two functions to be executed by function execution portion 151 as well as outputs to first communication control portion 153 a first screen of a first kind corresponding to a second function which is different from the first function so as to be displayed on second LCD 207. When the first screen is inputted from first display control portion 155, first communication control portion 153 transmits the first screen to charging base 200 via first communication portion 121. Consequently, the first screen is displayed on second LCD 207 of charging base 200. Thus, the user can view the first screen corresponding to the first function and the first screen corresponding to the second function at the same time.

In addition, when an operation is inputted to first touch panel 125, first operation accepting portion 157 outputs the inputted operation to function execution portion 151, and when first communication portion 121 receives an operation from charging base 200, first communication control portion 153 outputs the received operation to function execution portion 151.

Function execution portion 151 executes a first function according to the operation which was inputted from first operation accepting portion 157 and inputted into first touch panel 125. In addition, function execution portion 151 executes a second function according to the operation which was inputted from first communication control portion 153 and inputted into second touch panel 211 of charging base 200. Thus, the user can input the operations for executing the first function and the second function separately.

Figure 8:
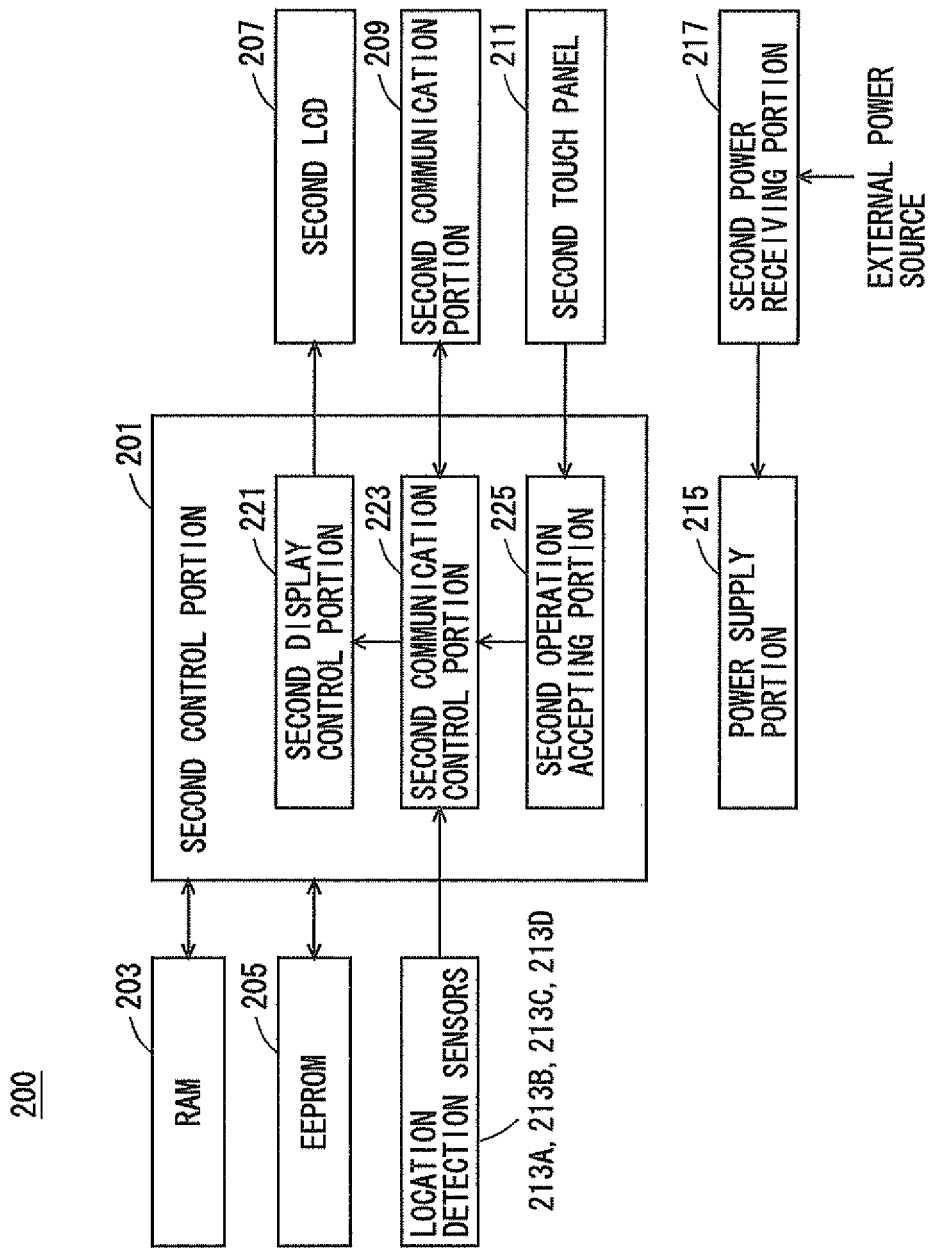
FIG. 8 is a schematic block diagram of a function of the charging base.

FIG. 8 is a schematic block diagram of a function of the charging base. With reference to FIG. 8, charging base 200 includes a second control portion 201 to control the entire charging base 200, an EEPROM 205 to store in a nonvolatile manner a program to be executed in second control portion 201 or data and the like to be referred to by the program, a RAM 203 to be used as a work area of second control portion 201, second LCD 207, a second communication portion 209 to communicate with mobile phone 100, a second touch panel 211 to accept an operation by a user, location detection sensors 213A, 213B, 213C, and 213D, a second power receiving portion 217 connected to an external power source, and power supply portion 215 to supply electric power to mobile phone 100.

Second power receiving portion 217 is connected to a commercial power source serving as the external power source and converts alternating current to direct current. Second power receiving portion 217 is an AC adapter, for instance. Second power receiving portion 217 converts the alternating current supplied from the commercial power source to direct current and outputs it to power supply portion 215.

Location detection sensors 213A, 213B, 213C, and 213D are respectively placed corresponding to each of the sides of charging base 200 of groove 251. The four location detection sensors 213A, 213B, 2130, and 213D are, for instance, proximity switches, pressure switches, and the like. When mobile phone 100 is connected to charging base 200, mobile phone 100 engages groove 251 at one side among four sides of groove 251, and one of the four location detection sensors 213A, 213B, 213C, and 213D placed at groove 251 that engages mobile phone 100 detects that the connection has been made with mobile phone 100.

Power supply portion 215 converts the direct current into electromagnetic wave and transmits it. Consequently, if mobile phone 100 exists close to charging base 200, first power receiving portion 139 provided in mobile phone 100 will receive the electromagnetic wave transmitted by power supply portion 215.

Second communication portion 209 communicates by wireless with first communication portion 121 provided in mobile phone 100. As for the communication method, a communication method which enables communication with first communication portion 121 is used. Moreover, second communication portion 209 may communicate with first communication portion 121 by wired communication.

Second control portion 201 includes a second communication control portion 223 to control second communication portion 209, a second display control portion 221 to control display of second LCD 207, and a second operation accepting portion 225 to accept an operation by the user.

Second communication control portion 223 controls second communication portion 209. When second communication portion 209 becomes capable of communicating with first communication portion 121 of mobile phone 100 and is connected to four location detection sensors 213A, 213B, 213C, and 213D, second communication control portion 223 transmits to mobile phone 100 via second communication portion 209 the identification information predetermined in relation to the one of the four location detection sensors 213A, 213B, 213C, and 213D which has outputted the signal indicating that it has detected mobile phone 100.

Moreover, when second communication portion 209 becomes capable of communicating with first communication portion 121 of mobile phone 100 and receives a first screen or a second screen from first communication portion 121, second communication control portion 223 outputs the first screen or the second screen received to second display control portion 221. When the first screen or the second screen is inputted from second communication control portion 223, second display control portion 221 displays on second LCD 207 the first screen or the second screen inputted.

Second operation accepting portion 225 is connected to second display control portion 221 and accepts the operation which the user inputs into second display control portion 221. Second operation accepting portion 225 outputs the operation by the user inputted into second touch panel 211 to second communication control portion 223. Second communication control portion 223 transmits the operation inputted from second operation accepting portion 225 to mobile phone 100 via second communication portion 209.

Next, the first to the third screen will be described. Here, the case where function execution portion 151 executes the electronic mail editing function will be described as an example. Corresponding to the electronic mail editing function, a first screen, a second screen, and a third screen are assigned in advance.

Figure 9:
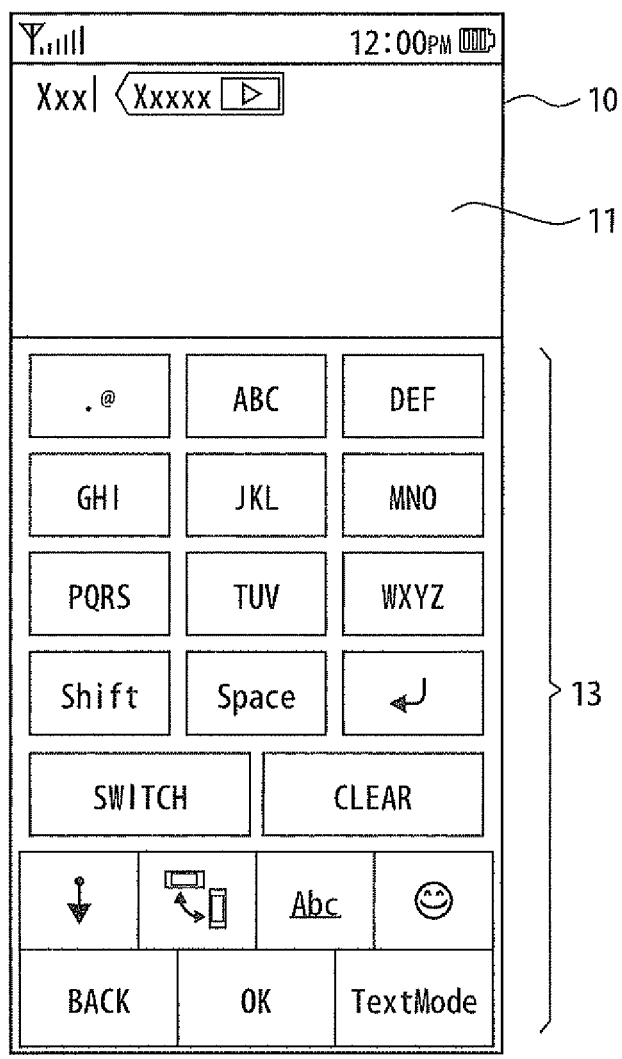
FIG. 9 is a diagram showing one example of a first screen.

FIG. 9 is a diagram showing one example of a first screen. With reference to FIG. 9, a first screen 10 corresponding to the electronic mail editing function includes a display area 11 to display the main text of the electronic mail inputted and a key display area 13 in which a plurality of keys for inputting characters are laid out. Key display area 13 includes nine keys, each key having a plurality of alphabetic characters allotted thereto. First screen 10 for the electronic mail editing includes display area 11 and key display area 13 so that the area of display area 11 is limited.

Figure 10:
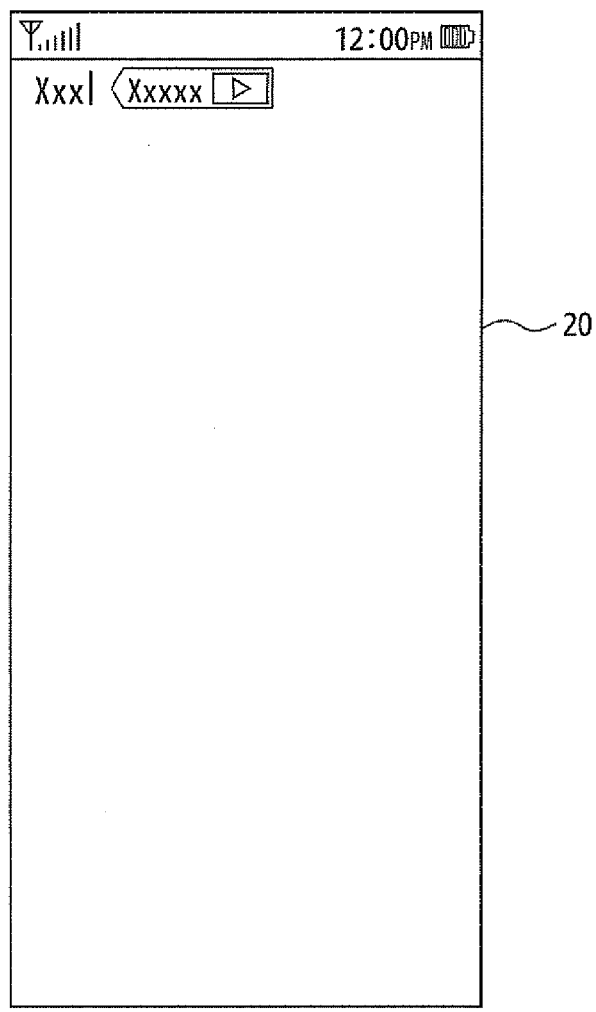
FIG. 10 is a first diagram showing one example of a second screen.

FIG. 10 is a first diagram showing one example of a second screen. A second screen 20 corresponding to the electronic mail editing function shown in FIG. 10 is the second screen which is selected in the case of the first form of connection or the second form of connection. With reference to FIG. 10, second screen 20 corresponding to the electronic mail editing function includes a display area to display on its entire area the inputted main text of the electronic mail and is rectangular in shape with its length disposed vertically. When second screen 20 corresponding to the electronic mail editing function is displayed, either the ten-key type operation accepting screen shown in FIG. 6 or the alphabet-type operation accepting screen shown in FIG. 7 is selected as the third screen and is displayed on second LCD 207 of charging base 200. With second screen 20 corresponding to the electronic mail editing, the inputted main text of the electronic mail is displayed on its entire area so that the main text can be displayed with no scrolling of the screen even when the main text is long.

Figure 11:
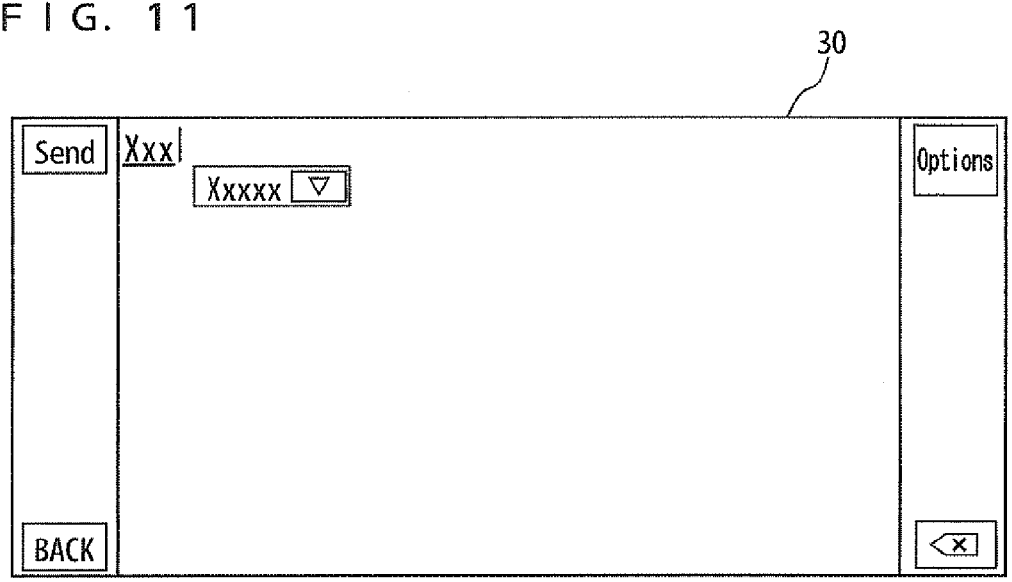
FIG. 11 is a second diagram showing one example of the second screen.

FIG. 11 is a second diagram showing one example of the second screen. A second screen 30 corresponding to the electronic mail editing shown in FIG. 11 is the second screen which is selected in the case of the third form of connection or the fourth form of connection. With reference to FIG. 11, second screen 30 corresponding to the electronic mail editing includes a display area to display on its entire area the inputted main text of the electronic mail and is rectangular in shape with its length disposed horizontally. When second screen 30 corresponding to the electronic mail editing is displayed, either the ten-key type operation accepting screen shown in FIG. 6 or the QWERTY type operation accepting screen shown in FIG. 7 is selected as the third screen and is displayed on second LCD 207 of charging base 200. With second screen 30 corresponding to the electronic mail editing function, the inputted main text of the electronic mail is displayed on its entire area such that it is longer in the horizontal direction so that the main text can be displayed with no scrolling of the screen even when the main text is lengthy. In addition, since it is longer in the horizontal direction in comparison with second screen 20 shown in FIG. 10, more characters can be arranged in the lateral direction, and the main text of the electronic mail can be displayed in a manner which facilitates reading.

Figure 12:
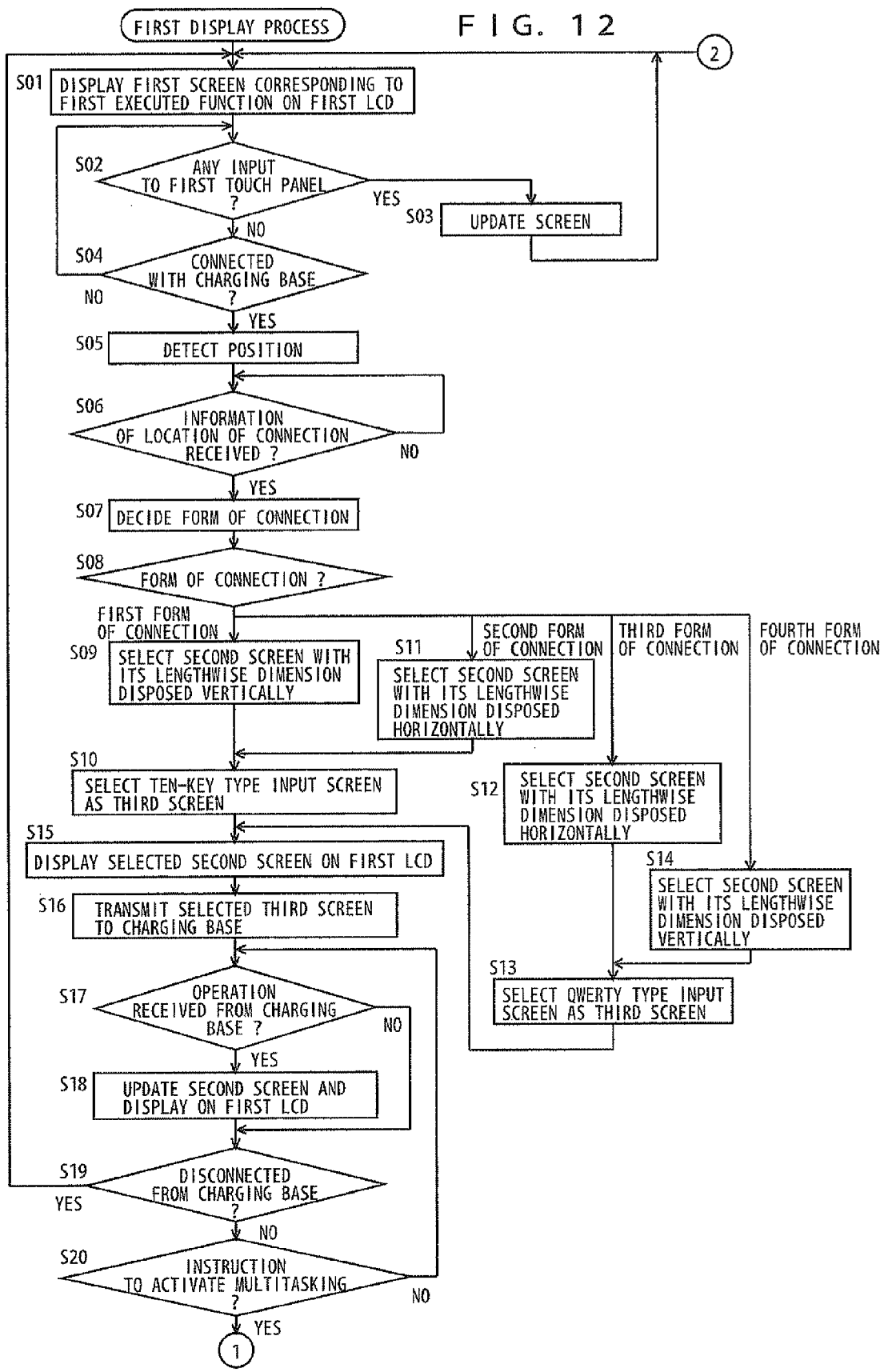
FIG. 12 is a first flow chart showing one example of the flow of a first display process.
Figure 13:
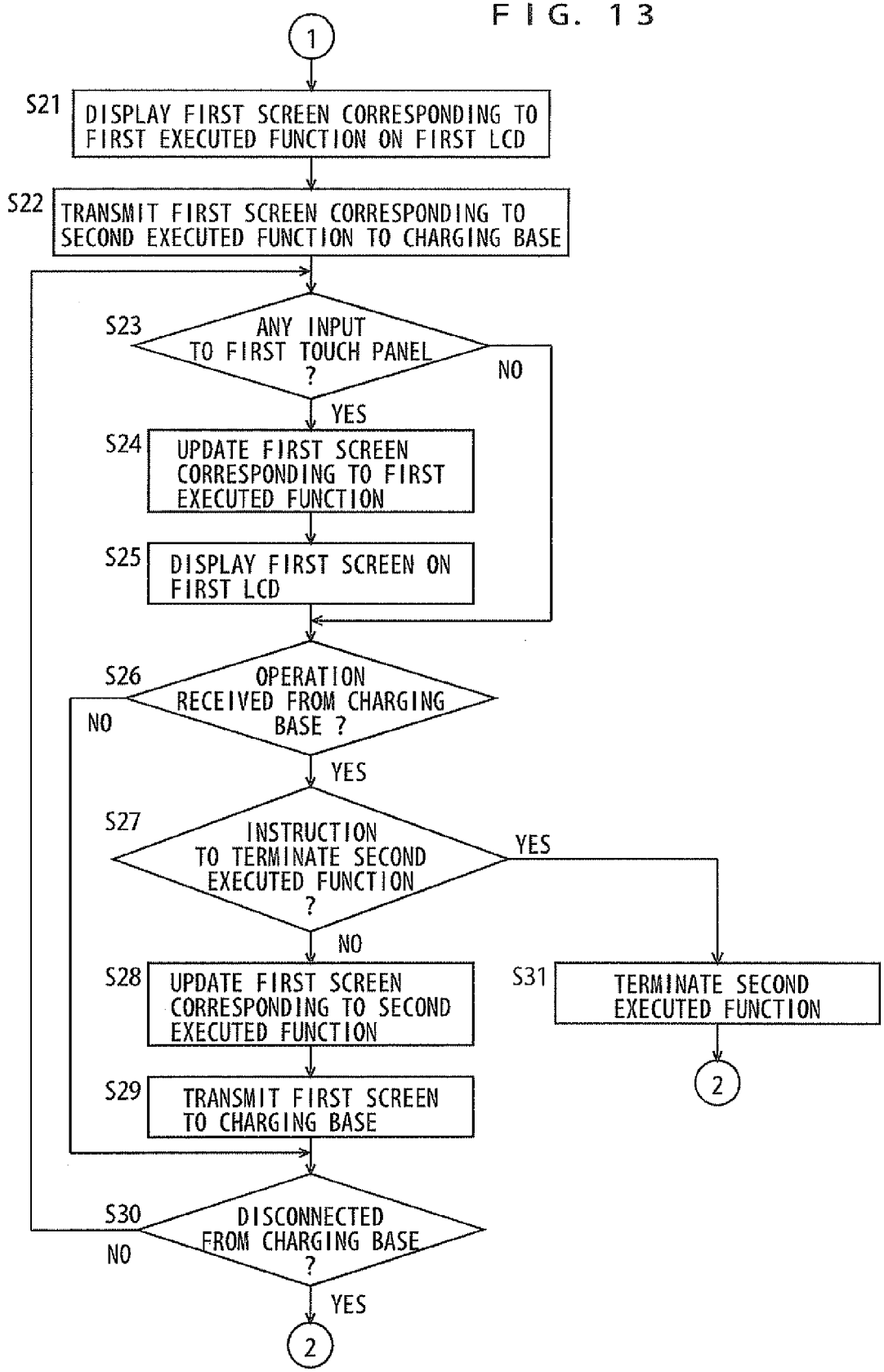
FIG. 13 is a second flow chart showing one example of the flow of the first display process.

FIG. 12 and FIG. 13 are flow charts showing one example of the flow of a first display process. The first display process is the process executed by first control portion 101 as a result of first control portion 101 provided in mobile phone 100 executing a display program.

With reference to FIG. 12, first control portion 101 displays on first LCD 123 a first screen of a first kind corresponding to a first executed function being executed among a plurality of functions (step S01). Then, it is determined whether a user has inputted an operation into first touch panel 125 or not (step S02). If it is determined that the user has inputted an operation, the process proceeds to step S03, but if not, the process proceeds to step S04. In step S03, the first screen displayed on first LCD 123 in step S01 is updated, and the process goes back to step S01. The first executed function is executed according to the operation inputted in step S02, and the first screen is updated by an image which indicates the result of execution.

In step S04, it is determined whether the connection has been made with charging base 200 or not. It is determined whether the connection has been made with the charging base or not depending on whether first communication portion 121 has become capable of communicating with charging base 200 or not. If the connection has been made with charging base 200, the process proceeds to step S05, but if not, the process goes back to step S02.

In step S05, the position of mobile phone 100 is detected. The position of mobile phone 100 is detected based on the accelerations in three axes outputted by acceleration sensor 129. Then, it is determined whether first communication portion 121 has received the location of connection from charging base 200 or not (step S06). The process stands by until the location of connection is received (NO in step S06), and if the location of connection has been received (YES in step S06), the process proceeds to step S07.

In step S07, the form of connection is decided. It is decided which of the first to fourth forms of connection the form of connection between mobile phone 100 and charging base 200 is. One of the first to fourth forms of connection is decided on based on the position of mobile phone 100 detected in step S05 and the location of connection received in step S06.

In the next step S08, the process diverges depending on the form of connection decided in step S07. If it is decided on the first form of connection, the process proceeds to step S09; if it is decided on the second form of connection, the process proceeds to step S11; if it is decided on the third form of connection, the process proceeds to step S12; and if it is decided on the fourth form of connection, the process proceeds to step S14.

In step S09, the second screen with its lengthwise dimension disposed vertically that corresponds to the first executed function is selected, and the process proceeds to step S10. In step S11, the second screen with its lengthwise dimension disposed horizontally that corresponds to the first executed function is selected, and the process proceeds to step S10. In step S10, a ten-key type operation accepting screen is selected as a third screen, and the process proceeds to step S15.

In step S12, the second screen with its lengthwise dimension disposed horizontally that corresponds to the first executed function is selected, and the process proceeds to step S13. In step S14, the second screen with its lengthwise dimension disposed vertically that corresponds to the first executed function is selected, and the process proceeds to step S13. In step S13, a QWERTY type operation accepting screen is selected as a third screen, and the process proceeds to step S15.

In step S15, the second screen selected in step S09, step S11, step S12, or step S14 is displayed on first LCD 123. In the next step S16, the third screen selected in step S10 or step S13 is transmitted to charging base 200 via first communication portion 121. Consequently, the third screen is displayed on second LCD 207 of charging base 200.

In step S17, it is determined whether an operation has been received from charging base 200 or not. If first communication portion 121 has received the operation from charging base 200, the process proceeds to step S18, but if not, step S18 is skipped and the process proceeds to step S19. In step S18, the second screen is updated, the updated second screen is displayed on first LCD 123, and the process proceeds to step S19. The first executed function is executed according to the operation received in step S17, and the second screen is updated by an image which indicates the result of execution.

In step S19, it is determined whether the connection with charging base 200 has been terminated or not. The connection is determined to have been terminated when first communication portion 121 is no longer capable of communicating with second communication portion 209 of charging base 200. If the connection with charging base 200 has been terminated, the process goes back to step S01, but if not, the process proceeds to step S20.

In step S20, it is determined whether the instruction to activate the multitasking mode for causing the execution of a second executed function by the multitasking mode has been accepted or not. If the instruction to activate the multitasking mode has been accepted, the process proceeds to step S21, but if not, the process goes back to step S17.

Thus, until the connection with charging base 200 is terminated or the instruction to activate the multitasking mode is accepted, either the ten-key type operation accepting screen or the QWERTY type operation accepting screen is displayed as a third screen on second LCD 207 of charging base 200, a first function is executed based on the operation received from charging base 200, and the second screen being displayed on first LCD 123 is updated.

In step S21, a first screen of a first kind corresponding to the first executed function is displayed on first LCD 123. Then, in step S22, a first screen of a first kind corresponding to the second executed function is transmitted to charging base 200.

In the next step S23, it is determined whether an operation has been inputted in first touch panel 125 or not. If the operation has been inputted into first touch panel 125, the process proceeds to step S24, but if not, the process proceeds to step S26. In step S24, the first screen corresponding to the first executed function displayed on first LCD 123 in step S21 is updated. Then, the updated first screen is displayed on first LCD 123, and the process proceeds to step S26 (step S25).

In step S26, it is determined whether first communication portion 121 has received an operation from charging base 200 or not. If the operation has been received from charging base 200, the process proceeds to step S27, but if not, the process proceeds to step S30. In step S27, it is determined whether the received operation is the instruction to terminate the second executed function or not. If the operation of the instruction to terminate the second executed function has been received, the process proceeds to step S31, but if not, the process proceeds to step S28. In step S31, the second executed function is terminated, and the process goes back to step S01. In the case where the process proceeds to step S31, the single-tasking mode is entered into, and the first executed function alone is executed.

In step S28, the first screen corresponding to the second executed function transmitted to charging base 200 in step S22 is updated, and the process proceeds to step S29. In step S29, the updated first screen corresponding to the second executed function is transmitted to charging base 200 via first communication portion 121, and the process proceeds to step S30.

In step S30, it is determined whether the connection with charging base 200 has been terminated or not. If the connection with charging base 200 has been terminated, the process goes back to step S01, but if not, the process goes back to step S23.

Figure 14:
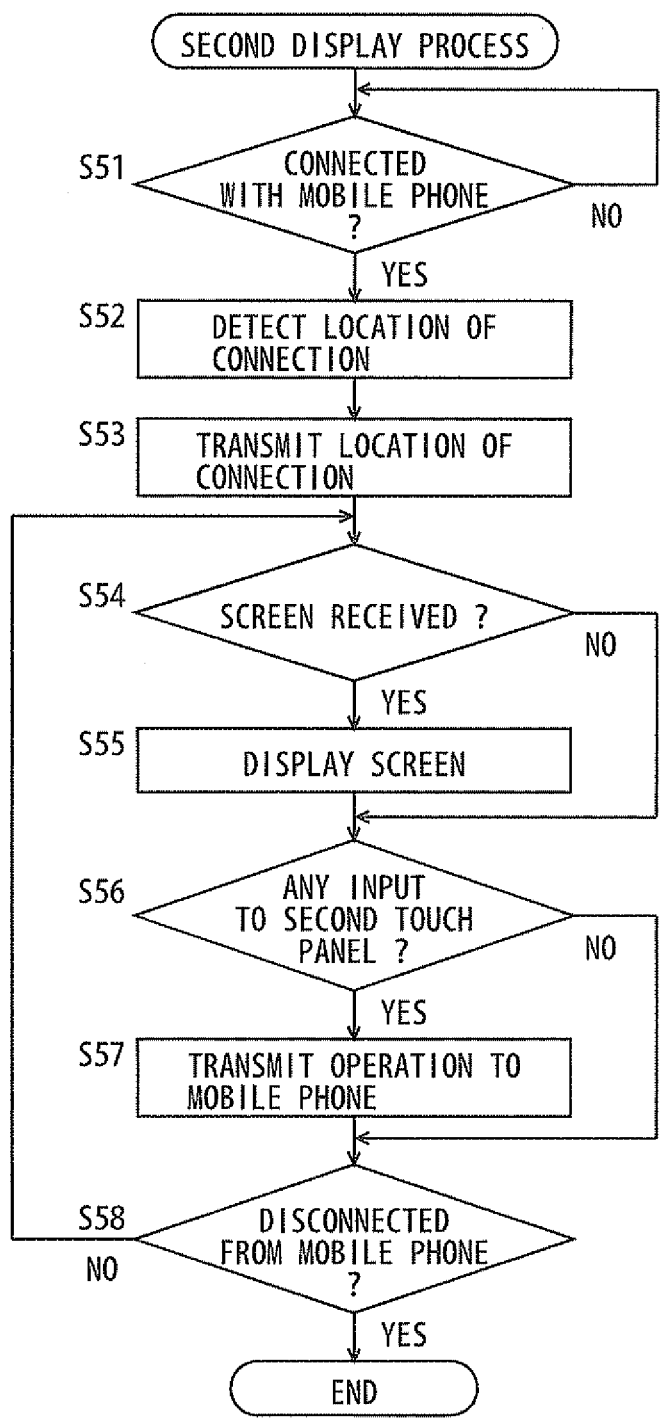
FIG. 14 is a flow chart showing one example of the flow of a second display process.

FIG. 14 is a flow chart showing one example of the flow of a second display process. The second display process is the process executed by second control portion 201 as a result of second control portion 201 provided in charging base 200 executing a second display program.

With reference to FIG. 14, second control portion 201 determines whether the connection has been made with mobile phone 100 or not (step S51). If one of four location detection sensors 213A, 213B, 213C, and 213D detects mobile phone 100, it is determined that the connection has been made with the mobile phone. The process stands by until the connection established with mobile phone 100 is detected (NO in step S51), and if the established connection with mobile phone 100 is detected, the process proceeds to step S52.

In step S52, the location of connection is detected based on which of the four location detection sensors 213A, 213B, 213C, and 213D has detected mobile phone 100. Then, the detected location of connection is transmitted to mobile phone 100 via second communication portion 209 (step S53). In step S54, it is determined whether second communication portion 209 has received a screen from mobile phone 100 or not. The screen to be received here is either one of the first screen and the third screen described above. In step S55, the screen received in step S54 is displayed on second LCD 207, and the process proceeds to step S56.

In step S56, it is determined whether an operation has been inputted into second touch panel 211 or not. If the operation has been inputted, the process proceeds to step S57, but if not, step S57 is skipped and the process proceeds to step S58. In step S57, the inputted operation is transmitted to mobile phone 100 via second communication portion 209, and the process proceeds to step S58.

In step S58, it is determined whether the connection with mobile phone 100 has been terminated or not. The connection is determined to have been terminated when every one of the four location detection sensors 213 ceases to detect mobile phone 100. If the connection with mobile phone 100 has been terminated, the process ends, but if not, the process goes back to step S54.

As described above, in a charging system for a mobile phone according to the present embodiment, when mobile phone 100 and charging base 200 are not connected in a manner that allows communication, mobile phone 100 displays a first screen predetermined in correspondence to an executed function, and when mobile phone 100 and charging base 200 are connected in a manner that allows communication, mobile phone 100 displays a second screen predetermined in correspondence to the executed function and a power receiving device displays a third screen predetermined in correspondence to the executed function. Thus, when mobile phone 100 executes a certain function, the screens to be displayed can be differentiated for the situation where mobile phone 100 is connected with charging base 200 in a manner that allows communication and for the situation where it is not connected with charging base 200 in a manner that allows communication. When mobile phone 100 is connected with charging base 200 in a manner that allows communication, the area for displaying the screen can be made larger than when it is not connected with charging base 200 in a manner that allows communication.

In addition, charging base 200 is provided with second touch panel 211 to accept a second operation by the user, and when the second operation is accepted by second touch panel

211, a function is executed according to the second operation by mobile phone 100. Thus, charging base 200 can be made to serve as a device to input an operation into mobile phone 100.

Moreover, the third screen displayed on charging base 200 is used as an operation accepting screen so that a variety of operation accepting screens can be displayed on charging base 200, which makes it possible to facilitate the operation.

Further, of the ten-key type operation accepting screen and the QWERTY type operation accepting screen, the one predetermined in correspondence to the form of connection in which mobile phone 100 is connected with charging base 200 is displayed on charging base 200 so that it becomes possible to display the operation accepting screen which is easier to operate according to the form of connection.

Furthermore, when mobile phone 100 executes a first function and a second function in parallel, mobile phone 100 displays a screen corresponding to the first function as well as accepts an operation, while charging base 200 displays a screen corresponding to the second function as well as accepts an operation. Consequently, it becomes possible to facilitate the operation in the case where mobile phone 100 executes two functions in parallel.

It is to be understood that the embodiments disclosed herein are in every aspect illustrative and non-limiting. The scope of the present invention is indicated not by the above description but by the description of the claims and is further intended to include the meaning equivalent to the claims and all modifications within the scope.

The invention claimed is:

1. A charging system for a mobile communication device comprising a mobile communication device and a charging device to charge said mobile communication device, said mobile communication device comprising:
   a first power receiving portion to receive supply of electric power from said charging device;
   a first operation accepting portion to accept a first operation by a user;
   a function execution portion to execute at least one of a plurality of functions;
   a first display portion to display information;
   a first display control portion to display at said first display portion: i) an output image outputted when said function execution portion executes a function, or ii) an operation accepting image for accepting an operation in order to execute the function; and
   a first communication portion to communicate with said charging device, said charging device comprising:
   a second power receiving portion to accept electric power from an external power source;
   a second communication portion to communicate with said mobile communication device;
   a second display portion to display an image; and
   a second display control portion to control display of the image by said second display portion, wherein
   said first display control portion:
      i) displays at said first display portion a first image predetermined in correspondence to an executed function when said first communication portion is incapable of communicating with said charging device,
      ii) displays at said first display portion a second image predetermined in correspondence to said executed function being executed by said function execution portion among said plurality of functions, and
      iii) controls said second display control portion via said first communication portion to display at said second display portion a third image predetermined in correspondence to said executed function when said first communication portion is capable of communicating with said charging device; and
   said mobile communication device is capable of connecting with said charging device in a plurality of forms of connection and further comprising a connection form detecting portion to detect a form of connection established with said charging device from among said plurality of forms of connection, wherein
   said first display control portion selects from a plurality of operation accepting images an operation accepting image predetermined in correspondence to said form of connection detected and transmits the selected operation accepting image as said third image to said second display control portion via said first communication portion.

2. A charging system for a mobile communication device comprising a mobile communication device and a charging device to charge said mobile communication device, said mobile communication device comprising:
   a first power receiving portion to receive supply of electric power from said charging device;
   a first operation accepting portion to accept a first operation by a user;
   a function execution portion to execute at least one of a plurality of functions;
   a first display portion to display information;
   a first display control portion to display at said first display portion: i) an output image outputted when said function execution portion executes a function, or ii) an operation accepting image for accepting an operation in order to execute the function; and
   a first communication portion to communicate with said charging device, said charging device comprising:
   a second power receiving portion to accept electric power from an external power source;
   a power supply portion to supply at least a portion of said electric power accepted to said mobile communication device;
   a second display portion to display an image;
   a second communication portion to communicate with said mobile communication device; and
   a second display control portion to control display of the image by said second display portion, wherein
   said first display control portion:
      i) displays at said first display portion a first image predetermined in correspondence to an executed function when said first communication portion is incapable of communicating with said charging device,
      ii) displays at said first display portion a second image predetermined in correspondence to said executed function being executed by said function execution portion among said plurality of functions, and
      iii) transmits a third image predetermined in correspondence to said executed function via said first communication portion to said second display control portion when said first communication portion is capable of communicating with said charging device, and
   said second display control portion displays at said second display portion said third image received by said second communication portion; and
   said mobile communication device is capable of connecting with said charging device in a plurality of forms of connection and further comprising a connection form detecting portion to detect a form of connection established with said charging device from among said plurality of forms of connection, wherein
said first display control portion selects from a plurality of operation accepting images an operation, accepting image predetermined in correspondence to said form of connection detected and transmits the selected operation accepting image as said third image to said second display control portion via said first communication portion.

3. The charging system for a mobile communication device according to claim 2, wherein
said charging device comprises a second operation accepting portion to accept a second operation by the user,
said second operation accepting portion, when said second operation is accepted, transmits the second operation to said mobile communication device via said second communication portion, and
when said second operation is received from said charging device by said first communication portion, said function execution portion executes one of said plurality of functions according to the received second operation.

4. The charging system for a mobile communication device according to claim 3, wherein
said function execution portion is capable of executing a first function and a second function in parallel among said plurality of functions when said first communication portion is capable of communicating with said charging device,
when said first communication portion is capable of communicating with said charging device and when said function execution portion executes said first function and said second function in parallel, said first display control portion displays a first image predetermined in correspondence to said first function on said first display portion as well as transmits a first image predetermined in correspondence to said second function via said first communication portion, and
said function execution portion executes said first function according to said first operation accepted by said first operation accepting portion and executes said second function according to said second operation received from said charging device by said first communication portion.

* * * * *